H. P. SACHSE
RHEOSTAT
July 12, 1932.
Re. 18,521
Original Filed March 1, 1929 2 Sheets-Sheet 1
Fig. 1
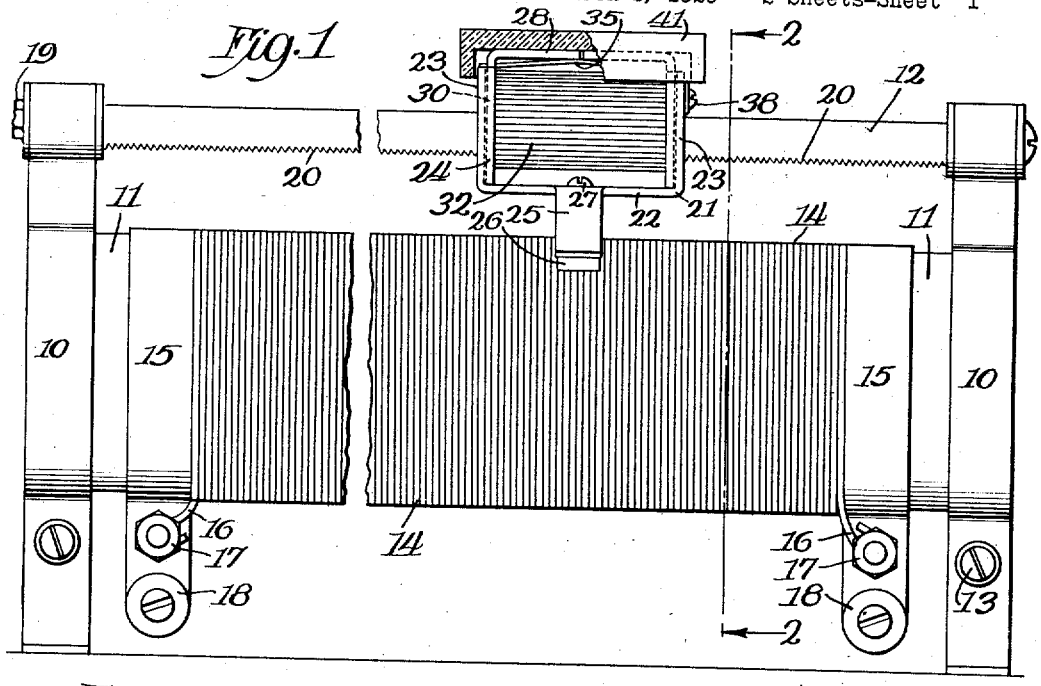
Fig. 3
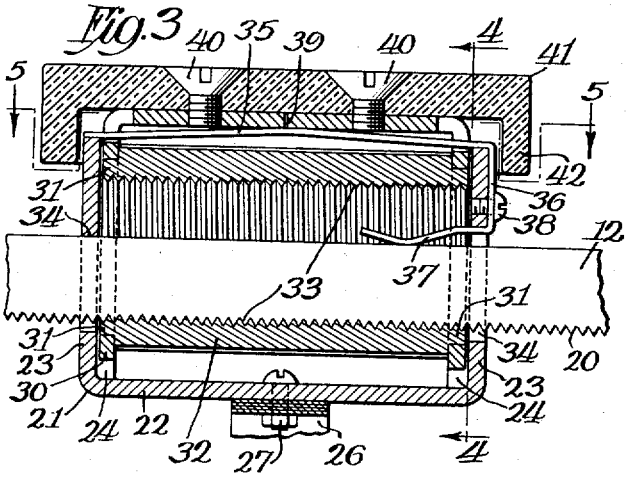
Fig. 2
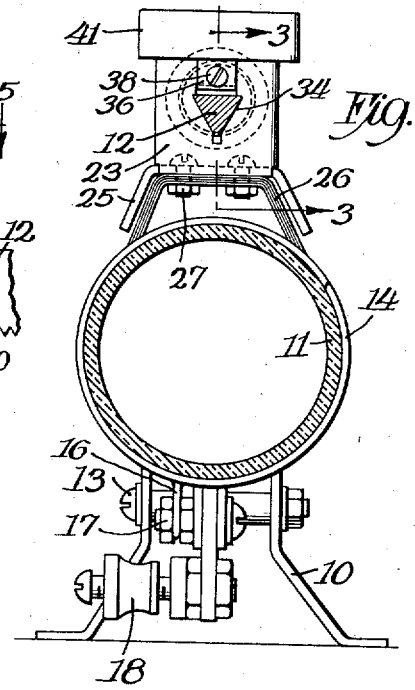
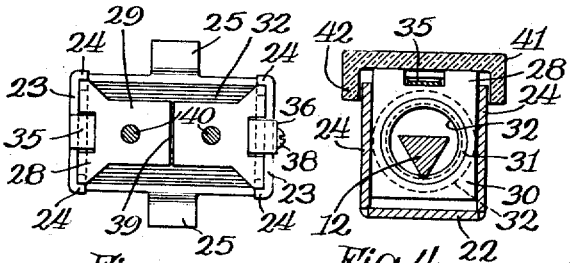
Fig. 5
Fig. 4
Inventor:
Herman Paul Sachse
By Wilson, Mann & Co. Attys.

H. P. SACHSE

July 12, 1932. RHEOSTAT Re. 18,521

Original Filed March 1, 1929 2 Sheets-Sheet 2

Inventor:
Herman Paul Sachse
By Gilson, Mann & Co.
Attys

Reissued July 12, 1932

Re. 18,521

UNITED STATES PATENT OFFICE

HERMAN PAUL SACHSE, OF CHICAGO, ILLINOIS, ASSIGNOR TO CENTRAL SCIENTIFIC COMPANY, OF CHICAGO, ILLINOIS, A CORPORATION OF ILLINOIS

RHEOSTAT

Original No. 1,839,343, dated January 5, 1932, Serial No. 343,734, filed March 1, 1929. Application for reissue filed February 1, 1932. Serial No. 590,278.

This invention relates to rheostats, and has for its principal object to provide an improved structure whereby extensive adjustments of the resistance can be made either quickly or slowly and with great accuracy.

Further objects and advantages of the invention will become apparent as the disclosure proceeds and the description is read in connection with the accompanying drawings showing two selected embodiments, and in which Fig. 1 is a side elevation of the familiar type of wire wound rheostat, with the invention applied thereto;

Fig. 2 is a transverse section taken on the line 2—2 of Fig. 1;

Fig. 3 is an enlarged section of a fragment taken on the line 3—3 of Fig. 2;

Fig. 4 is a transverse section taken on the line 4—4 of Fig. 3 but on a reduced scale;

Fig. 5 is a horizontal section taken on the line 5—5 of Fig. 3 but to the same scale as Fig. 4;

Figure 6:
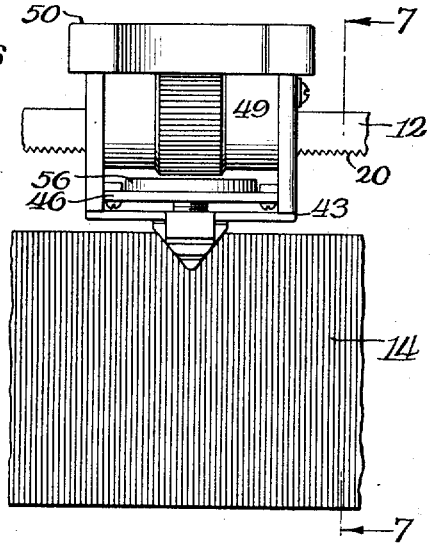
Fig. 6 is an enlarged side elevation of parts of a wire wound rheostat but including another embodiment of the invention.
Figure 7:
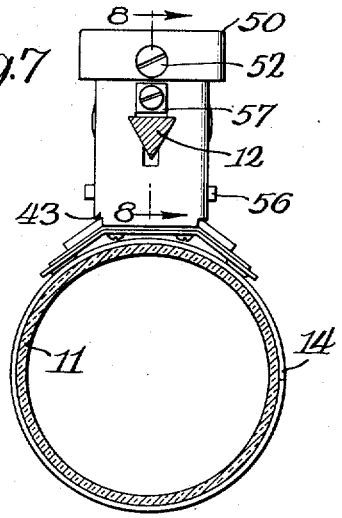
Fig. 7 is a transverse sectional view taken on the line 7—7 of Fig. 6.
Figure 8:
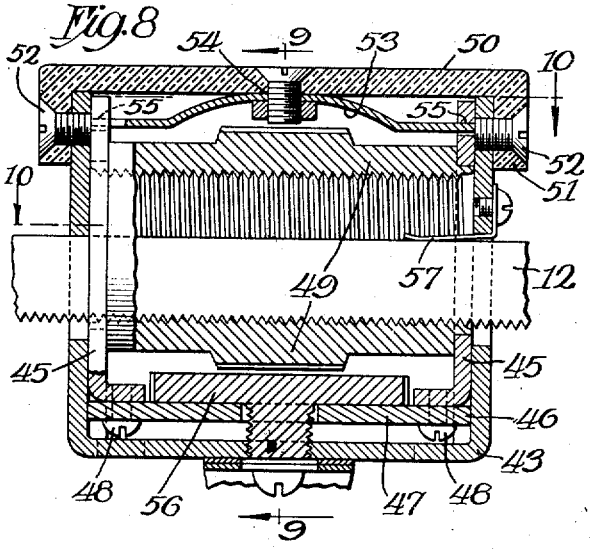
Fig. 8 is a longitudinal vertical section taken on the line 8—8 of Fig. 7.
Figure 9:
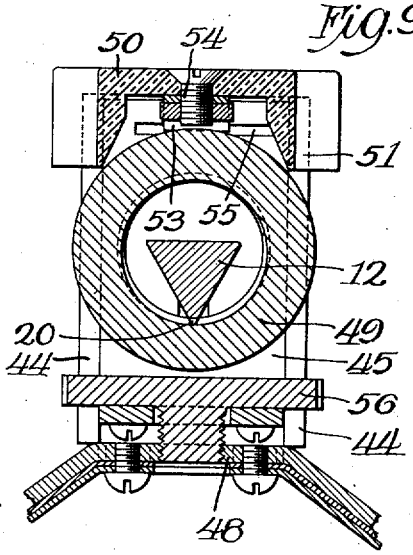
Figure 10:
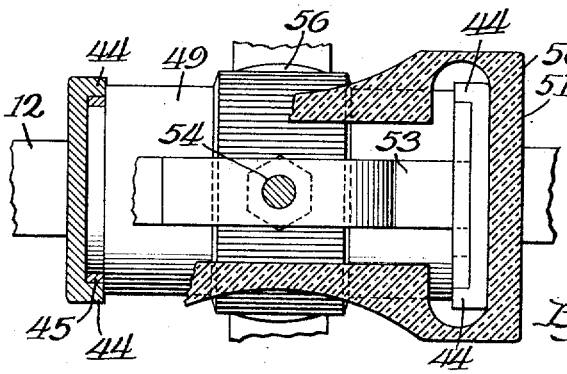

Figs. 9 and 10 are a vertical transverse section and a horizontal longitudinal section, respectively, taken on the lines 9—9 and 10—10 of Fig. 8.

But these specific illustrations and the correspondingly specific description are used solely for the purpose of disclosure, and are not intended to indicate that the invention is so limited.

The rheostat shown in Fig. 1 includes end frames 10, made of bar stock, and clamped to the ends of a tube 11 of insulating material and a bar 12 by means of bolts 13. The resistance wire 14 is wound in a helix on tube 11, with its end turns in contact with straps 15 to which the ends 16 of the wire 14 are made fast by the bolts 17. The straps 15 are provided with binding posts 18, and one end of the bar 12 is provided with a binding post 19. Rheostats of this general construction, and having a sliding contact mounted on the bar 12, are familiar and therefore need not be enlarged upon.

According to the embodiments of the invention here illustrated the bar 12 is triangular in cross-section (Figs. 2 and 4) and its lower edge is provided with teeth 20 composed of short segments of threads; and for convenience this rod 12 will be referred to as a rack.

Mounted on the rack is a carriage 21 including a base portion 22 and upwardly directed arms 23, the edges of the latter being bent to form pairs of upright flanges 24. The base portion is provided with oppositely directed downwardly inclined arms 25, between and below which the resilient strips 26, forming the contact proper, are secured by bolts 27. The arms 23 of the carriage are provided with triangular openings 34 receiving the rack and cooperating with its sides to guide the carriage along the rack.

A frame 28, including a base portion 29, has downwardly directed arms 30 lying between and guided by the respective pairs of guide flanges 24. The arms 30 are perforated in alignment to receive the trunnions 31 of a nut 32, having an internal thread 33 adapted to engage and cooperate with the teeth 20 of the rack. A leaf spring 35 rests on the upper ends of the arms 23 and has its intermediate portion in contact with the intermediate portion of the base 29 of the frame 28, and serves to constantly urge the frame upwardly, and, therefore, the threads of the nut into engagement with the teeth of the rack.

The spring 35 has an extension 36 running downwardly along one arm 23 and thence inwardly at 37 to bear on the top surface of the rack 12 and act as a stabilizer and brake. A screw 38, passing through the extension 36 and into the arm 23, holds the spring in position.

For convenience the frame 28 is made in two parts separated at 39, and held together by screws 40 which secure the frame to a hand-piece 41 of insulating material, provided with a depending flange 42.

When it is desired to make a substantial movement of the contact 26 quickly, the hand-piece 41 is pressed down, compressing the spring 35, lowering the frame 28 and removing the threads of the nut out of engagement with the teeth of the rack. Then a light pressure in the appropriate direction will move the carriage and the contact to approximately the position desired. Upon relieving the pressure on the hand-piece, the spring 35 will cause the nut to reengage the rack, and the accuracy of adjustment may be made by a slow motion of the thread. When it is desired to make extensive adjustments gradually, the entire movement can be made by rotating the nut 39, and an exact adjustment can easily be obtained.

In the other form shown on sheet 2, the carriage includes a U-shaped frame 43, corresponding in general form and function to the carriage 21, and having on its upwardly directed arms pairs of flanges 44 between which the arms 45 of the frame 46 are received, as in the form shown on Fig. 1; but in this instance the base 47 of the frame is at the bottom instead of the top and comprises a perforated bar secured to the arms by screws 48.

The nut 49 has trunnion bearings in the arms 45 and cooperates with the rack in much the same way as in the form shown on sheet 1. The hand-piece 50 has a flange 51, the end portions of which are secured to the upper ends of the arms of the carriage 43 by screws 52. A leaf spring 53, having its intermediate bowed portion made fast to the hand-piece at 54, has its ends in slots 55 in the arms 45 of the frame 46.

As in the other modification the spring urges the frame to hold the threads of the nut 49 in engagement with the rack. This engagement of the threads with the rack, however, is obtained by turning the screw 56 which extends through the base 47 of the frame and is threaded into the base of the carriage. Turning the screw clockwise will lower the frame against the resistance of the spring 53 and disengage the nut from the rack. Reverse movement will permit the spring to effectively engage it.

A spring brake 57, mounted on the carriage and cooperating with the under surface of the rack, serves to stabilize the carriage. When the nut is disengaged from the rack the carriage can be moved back and forth as is customary with all rheostats of this type, but when it is desired to make accurate adjustments or continued slow adjustments, the nut may be permitted to engage the rack.

I claim as my invention:—

1. In a rheostat, a rack, a carriage engaged with the rack to travel along it, a sliding contact mounted to travel with the carriage, a frame associated with the carriage having limited movement relative to it, a nut journaled in the frame adapted to engage the rack to give slow motion and accurate adjustment to the contact and to be disengaged from the rack to release the contact for rapid adjustment, and means for holding the nut engaged with the rack.

2. In a rheostat, a rack, a carriage engaged with the rack to travel along it, a sliding contact mounted to travel with the carriage, a frame associated with the carriage having limited movement relative to it, a nut journaled in the frame adapted to engage the rack to give slow motion and accurate adjustment to the contact and to be disengaged from the rack to release the contact for rapid adjustment, and resilient means acting between the carriage and frame to urge the nut into yielding engagement with the rack.

3. In a rheostat, a rack, a carriage engaged with the rack to travel along it, a frame telescopically mounted with respect to the carriage, a nut journaled in the frame and adapted to engage the teeth of the rack, and yielding means partially urging the nut to engage the rack.

4. In a rheostat, a sliding contact, a carriage for the contact, a rack along which the carriage moves to shift the contact, a nut adapted to engage the rack to give slow motion and accurate adjustment to the contact and to be disengaged from the rack to release the contact for rapid adjustment, a frame loosely associated with the carriage and in which the nut is rotatably journaled, and yielding means urging the nut to engage the rack.

5. In a rheostat of the type including a resistance element and a slider movable along the element, the combination of a rack bar parallel to the resistance element, an internally threaded nut sleeved on the bar adapted to propel the slider along the bar when the nut is rotated, and means for quickly releasing the nut from the bar for rapid adjustment.

6. In a rheostat of the type including a resistance element and a slider movable along the element, the combination of a triangular rack bar parallel to the element and having rack teeth on one apex, an internally threaded nut sleeved upon the bar and engageable with the rack teeth, and spring means holding the nut in engagement with the rack teeth but adapted to be quickly released for making rapid adjustments.

7. In a rheostat, a rack, a carriage mounted solely on the rack and engaged therewith to travel along it, a rotatable element mounted in the carriage and engaged with the rack, and spring means mounted in the carriage and urging the rotatable element into engagement with the rack.

8. In a variable resistance rheostat, a resistance element, a single rod mounted adjacent the resistance element provided with a plurality of notches along one side, a carriage mounted solely on the rod and provided with a slide contacting with the resistance element, a hand piece provided on the carriage whereby the carriage may be bodily moved for rough adjustments, a rotatable element journalled in the carriage, engaged with the notches on the rod, and operable from the carriage for making fine adjustments, and spring means mounted in the carriage and bearing against the opposite side of the rod for urging the rotatable means into meshing engagement with the notched side of the rod.

9. In a rheostat, a pair of end standards, a resistance element mounted therebetween, a conductive rack fixed against rotation in said standards and electrically connected to a terminal, a carriage having opposite end walls apertured to receive the rack carrying a brush electrically connected with the rack and in wiping engagement with the resistance element, and an element rotatably mounted in the carriage between said end walls and meshed with the rack, said carriage being mounted solely on and freely movable back and forth along the rack by rotation of the element and adapted to rest in any of a plurality of adjusted positions thereon.

In testimony whereof I affix my signature.

HERMAN PAUL SACHSE.